United States Patent
Smith et al.

(10) Patent No.: US 9,806,846 B2
(45) Date of Patent: Oct. 31, 2017

(54) WIRELESS SENSING WITH TIME REVERSAL

(71) Applicant: Ziva Corporation, San Diego, CA (US)

(72) Inventors: David Smith, Ellicott City, MD (US); Jeremy Rode, San Diego, CA (US); Anis Husain, San Diego, CA (US); Mark Hsu, Richmond, CA (US); Maha Achour, Encinitas, CA (US)

(73) Assignee: ZIVA CORP., San Diego, CA (US)

( * ) Notice: Subject to any disclaimer, the term of this patent is extended or adjusted under 35 U.S.C. 154(b) by 0 days.

(21) Appl. No.: 15/217,944

(22) Filed: Jul. 22, 2016

(65) Prior Publication Data

US 2017/0026147 A1    Jan. 26, 2017

Related U.S. Application Data

(60) Provisional application No. 62/196,885, filed on Jul. 24, 2015.

(51) Int. Cl.
    *H04K 3/00*        (2006.01)
    *H04W 4/02*        (2009.01)
    (Continued)

(52) U.S. Cl.
    CPC ................. *H04K 3/41* (2013.01); *H04B 7/01* (2013.01); *H04W 4/023* (2013.01); *H04W 84/18* (2013.01)

(58) Field of Classification Search
    CPC ....... G01S 13/505; H04K 3/41; H04W 4/023; H04W 84/18
    See application file for complete search history.

(56) References Cited

U.S. PATENT DOCUMENTS 9,201,132 B2    12/2015    Hsu et al.
9,497,722 B2    11/2016    Husain et al.
(Continued)

FOREIGN PATENT DOCUMENTS

WO    2012/151316 A1    11/2012
WO    2014/168892 A1    10/2014
(Continued)

OTHER PUBLICATIONS

Collaborative Beamfocusing Radios (COBRA): A reciprocity based distributed beamforming system, Rode, Gregorian, Ward, Husain, Jan. 24-27, 2016 (all pages).
(Continued)

*Primary Examiner* — Bobbak Safaipour
(74) *Attorney, Agent, or Firm* — Anatoly S. Weiser, Esq.; Techlaw LLP

(57) ABSTRACT

In examples, Radio Frequency Iterative Time-Reversal (RF-ITR) and singular value decomposition (SVD) are used by an array of nodes to characterize environment by identifying scatterer objects. The array may be ad hoc dynamic or stationary. The environment is cancelled from the RF-ITR by adjusting Time-Reversal (TR) prefilters, reducing illumination of the scatterer objects in the environment. This enables the RF-ITR process to focus on a moving target, which can then be sensed (discovered, identified, monitoring, tracked, and/or imaged). The moving target on which the RF-ITR process focuses may then be cancelled from the RF-ITR in the same way as the environment, allowing the RF-ITR to focus on another target. Multiple moving targets can thus be sensed. Defensive measures such as jamming may then be taken against the targets. The targets may be distinguished from the scatterer objects in the environment through differential, Doppler processing, and other classification techniques.

31 Claims, 6 Drawing Sheets

(51) Int. Cl.
*H04B 7/01* (2006.01)
*H04W 8/00* (2009.01)
*H04W 84/18* (2009.01)

(56) References Cited

U.S. PATENT DOCUMENTS

| | | |
|---|---|---|
| 9,548,799 B2 | 1/2017 | Hsu et al. |
| 2001/0033248 A1 | 10/2001 | Owechko |
| 2008/0003948 A1 | 1/2008 | Mitran |
| 2009/0076389 A1* | 3/2009 | Jin .................... G01S 13/9035 600/437 |
| 2012/0263056 A1 | 10/2012 | Smith et al. |
| 2012/0328037 A1* | 12/2012 | Hsu .................... G01S 1/725 375/267 |
| 2014/0126567 A1 | 5/2014 | Husain et al. |
| 2014/0301494 A1 | 10/2014 | Hsu et al. |
| 2015/0085853 A1 | 3/2015 | Smith et al. |
| 2015/0173034 A1 | 6/2015 | Rode et al. |
| 2015/0208431 A1 | 7/2015 | Chen et al. |
| 2016/0047894 A1 | 2/2016 | Rode et al. |
| 2017/0093475 A1* | 3/2017 | Smith .................... H04B 7/024 |

FOREIGN PATENT DOCUMENTS

| | | |
|---|---|---|
| WO | 2016/137898 A1 | 9/2016 |
| WO | WO 2016/137898 | 9/2016 |

OTHER PUBLICATIONS

Collaborative Beamfocusing Radio (COBRA), Rode, Hsu, Smith, Husain, May 28, 2013.
IEEE XPlore, Mar. 31, 2016, citation of Collaborative Beamfocusing Radios (COBRA): A reciprocity based distributed beamforming system, Rode et al., (acc. Nov. 17, 2016, all pages).
SPIE citation of Collaborative Beamfocusing Radio (COBRA), Rode, Hsu, Smith, Husain, May 28, 2013 (accessed Nov. 17, 2016, all pages).

* cited by examiner even with powerful and expensive phased arrays, including radar panels that require large platforms such truck-mounted radar panels. To detect weak RCS targets, scanning with a focused beam to obtain sufficient signal-to-noise ratio (SNR) may be important, resulting in a brute force raster scanning/panel rotation hemisphere searches of relatively long durations (e.g., tens of seconds), with multiple radar platforms needed in some cases to cover a large area. Another disadvantage of such conventional radar systems is that they have strong radar emissions that can reveal their locations, and hence the radar systems may be easily targeted for suppression. Furthermore, with the advent of sophisticated UAVs made with radar-absorbent materials, operation in X-Ku band frequencies may not present a viable solution, particularly for low-cost scalable radios. Therefore, scaling to low frequencies for resonance detection is not always feasible as the radar aperture size scales linearly with wavelength, resulting in unmanageably large radar panel sizes.

WIRELESS SENSING WITH TIME REVERSAL

CROSS-REFERENCE TO RELATED APPLICATIONS

The present application claims priority from U.S. Provisional Patent Application Ser. No. 62/196,885, entitled TIME-REVERSAL IN WIRELESS COMMUNICATIONS, filed on 24 Jul. 2015, which provisional patent application is incorporated by reference herein in its entirety, including specification, abstract, claims, tables, computer code appendix, and any and all other data in the provisional patent application.

FIELD OF THE DISCLOSURE

This disclosure relates generally to the field of wireless sensing systems and methods. Selected disclosed examples relate to distributed/cooperative communication arrays using Time-Reversal (TR) techniques for target sensing (including discovery, identification, monitoring, tracking, imaging), and for target jamming and other defensive measures.

BACKGROUND

There are many applications for real-time target sensing and jamming in both Line-of-Sight (LOS) environments and Non-Line-of-Sight (NLOS) environments, including target sensing/jamming behind opaque obstacles such as walls and doors. One such application is sensing a drone or another type of unmanned aerial vehicle (UAV) as it enters a protected area, to facilitate monitoring the UAV and controlling the UAV's activities. Another application is monitoring occupant motion by home automation systems, for example, to enable energy conservation measures and/or home security measures. In both of these types of applications, and in others, there is a need for systems and methods that can quickly beamform an electromagnetic signal based on processing the space, time, and frequency data embedded in the backscattered/reflected radiation.

Through-the-wall imaging with Synthetic Aperture Radar (SAR) may be effective in both military and commercial applications to identify, monitor, and track objects. SAR sensing may employ unlicensed and/or ultra-wideband (UWB) frequencies, as well as chirp and Orthogonal Frequency Division Multiplexing (OFDM) waveforms. A disadvantage of SAR systems in these applications may be SAR's typical complexity, long processing times, and high cost of infrastructure. One of the challenges of existing SAR technologies is that during the long space, time, and frequency signal processing duration of the backscattered radiation, the target may move, making the beamformed signal no longer sufficiently effective.

As the ubiquity of small UAVs increases, scalable low cost solutions to detect them, track them, and jam their communication links are gaining importance. Detection of UAVs with small radar cross sections (RCS) has often proven to be a challenge Additionally, widely-spaced sparse apertures for long-range detection are often not feasible, because they may require robust phase and frequency synchronization across all nodes, as well as intensive computations to calculate the beamforming weights.

A need in the art exists for improved techniques for overcoming these difficulties. A need in the art also exists for apparatus and articles of manufacture using such techniques to overcome these difficulties.

SUMMARY

This document describes embodiments, variants, and examples of novel concepts for addressing one or more of the needs identified above, and/or other needs. Selected embodiments described in this document include methods, apparatus, and articles of manufacture that may enable fast target search, and convergence from a wide field of view (WFOV, such as) omnidirectional/360° search to a rapid, pencil-beam focused tracking of multiple targets in ~10-100 ms, via a fast gradient descent search and resonance detection at low VHF to L-band frequencies. Some embodiments do not require beam scanning or sweeping to find targets and focus onto the targets. In selected embodiments using massively-distributed architecture, emissions from each node are individually weak, despite large signal gains on target, thereby spreading resources across a wide area and minimizing risk of total system loss from anti-radiation missiles. Selected embodiments enable automatic adaptation to various layout configurations and self-discovery of the system nodes that are in range for a desired use. The distributed, ad hoc architecture may operate on various types of installation and deployment, including deployment on a swarm of airborne UAVs for air-to-air detection, jamming, and munition guidance.

Although we describe in detail the more challenging case of distributed nodes, analogous methods and algorithms may be applied in the case of stationary nodes and in the case of a single node with an array of antennas. In the latter case, the antennas may be automatically synchronized in frequency, time, and phase by their common radio.

In an embodiment, a method of sensing one or more targets includes aligning a plurality of nodes (e.g., ad hoc nodes) of an array in time and frequency. The method also includes obtaining relative location of each node of the plurality of ad hoc nodes of the array, thereby obtaining relative layout of the array. The method additionally includes characterizing environment of the array by identifying one or more clutter objects. The method further includes searching for a first target using radio frequency iterative time reversal (RF-ITR) and clutter cancellation.

In aspects, the method further includes obtaining absolute geolocation of said each node of the plurality of ad hoc nodes of the array.

In aspects, the step of characterizing the environment includes employing RF-ITR with singular value decomposition (SVD) and successive clutter object cancellation.

In aspects, at least one of the steps of characterizing and searching for the first target (and possibly each of these steps) employs a signal classification process.

In aspects, the method further includes searching for a second target using radio frequency iterative time reversal (RF-ITR), clutter cancellation, and first target cancellation; the step of searching for the second target is performed after the step of searching for the first target.

In aspects, the method further includes searching for a third target using radio frequency iterative time reversal (RF-ITR), clutter cancellation, first target cancellation, and second target cancellation; the step of searching for the third target is performed after the step of searching for the second target.

In aspects, the signal classification process includes Doppler processing.

In aspects, the signal classification process includes differential processing.

In aspects, the signal classification process includes comparing location of the first target resulting from successive soundings of the first target.

In aspects, the step of searching for the first target includes performing signal classification based on direction of object movement.

In aspects, the step of searching for the first target includes performing signal classification based on speed of object movement.

In aspects, the method further includes jamming the first target, such as transmitting by the array a jamming signal focused on the first target.

In aspects, the method further includes guiding munition to the first target based on identification of location of the first target.

In aspects, the array has at least three ad hoc nodes.

In aspects, the array has at least four ad hoc nodes.

It should be noted that analogous methods may use an array of nodes that are not all ad hoc nodes, including arrays of all nodes that are not ad hoc nodes. Furthermore, the array may be an array of antennas of a single node.

In an embodiment, an array of a plurality of radio frequency nodes (e.g., ad hoc radio frequency nodes) is configured to align the plurality of ad hoc nodes in time and frequency; to obtain relative location of each node of the plurality of ad hoc nodes of the array, thereby obtaining relative layout of the array; to characterize environment of the array by identifying one or more clutter objects in the environment; and to search for a first target using radio frequency iterative time reversal (RF-ITR) and clutter cancellation.

In aspects, the array is further configured to obtain absolute geolocation of said each node of the plurality of ad hoc nodes of the array.

In aspects, the array is further configured to characterize the environment by performing RF-ITR with singular value decomposition (SVD) and successive clutter object cancellation.

In aspects, the array is further configured to search for the first target employing a signal classification process.

In aspects, the array is further configured to search for a second target using radio frequency iterative time reversal (RF-ITR), clutter cancellation, and first target cancellation.

In aspects, the array is further configured to search for a third target using radio frequency iterative time reversal (RF-ITR), clutter cancellation, first target cancellation, and second target cancellation.

In aspects, the signal classification process is based on Doppler processing.

In aspects, the signal classification process includes differential processing.

In aspects, the signal classification process includes comparing location of the first target resulting from successive soundings of the first target by the array.

In aspects, the signal classification process is based on direction of object movement.

In aspects, the signal classification process is based on speed of object movement.

In aspects, the array is further configured to jam the first target, e.g., by emitting a jamming signal focused on the location of first target using the TR pre-filters obtained in the course of searching for the first target using RF-ITR and clutter cancellation.

In aspects, the array further includes a munition guidance device configured to guide a munition to the first target, e.g., using the information such as TR pre-filters obtained in the course of searching for the first target using RF-ITR and clutter cancellation.

In aspects, the array includes at least three ad hoc nodes.

In aspects, the array includes at least four ad hoc nodes.

It should be noted that analogously-configured arrays may use some or all nodes that are not all ad hoc nodes. In fact, all of the analogously-configured nodes may be not ad hoc nodes.

Furthermore, the array may be an array of antennas of a single node.

In an embodiment, a method of sensing a target includes characterizing environment by identifying a plurality of stationary clutter objects using radio frequency iterative time reversal with successive clutter object cancellation; and searching for a plurality of moving targets using clutter cancellation and RF-ITR with successive target cancellation. The steps of characterizing and searching may be performed by one or more nodes, with a total of at least four antennas.

These and other features and aspects of the present invention will be better understood with reference to the following description, drawings, and appended claims.

DETAILED DESCRIPTION

Figure 1:
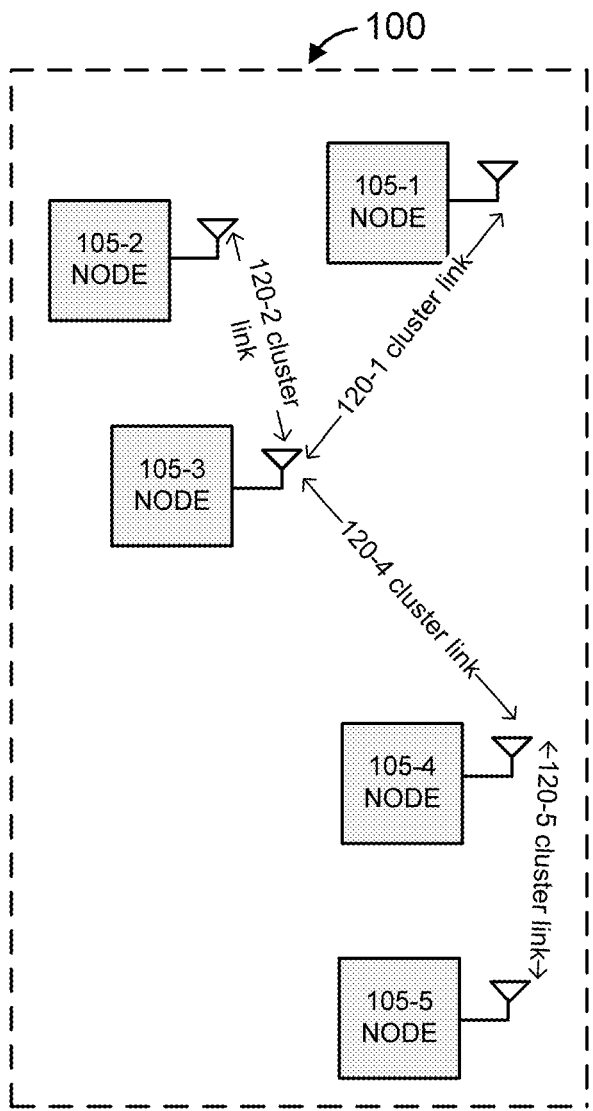
FIG. 1 illustrates selected nodes of an array of Radio Frequency nodes configured in accordance with one or more features described in this document.

The words "embodiment," "variant," "example," and similar words and expressions as used here refer to a particular apparatus, process, or article of manufacture, and not necessarily to the same apparatus, process, or article of manufacture. Thus, "one embodiment" (or a similar expression) used in one place or context may refer to a particular apparatus, process, or article of manufacture; the same or a similar expression in a different place or context may refer to a different apparatus, process, or article of manufacture. The expression "alternative embodiment" and similar words and phrases are used to indicate one of a number of different possible embodiments, variants, or examples. The number of possible embodiments, variants, or examples is not necessarily limited to two or any other quantity. Characterization of an item as "exemplary" means that the item is used as an example. Such characterization does not necessarily mean that the embodiment, variant, or example is a preferred one; the embodiment, variant, or example may but need not be a currently preferred embodiment, variant, or example. All embodiments, variants, and examples are described for illustration purposes and are not necessarily strictly limiting.

The words "couple," "connect," and similar words with their inflectional morphemes, as well as similar phrases, do not necessarily import an immediate or direct connection, but include within their meaning connections through mediate elements.

The expression "processing logic" should be understood as selected steps/decision blocks and/or hardware/software/firmware for implementing the selected steps/decision blocks. "Decision block" means a step in which a decision is made based on some condition, and process flow may be altered based on whether the condition is met or not.

A "target" may be an object that is being sensed (e.g., discovered, identified, monitored, tracked, imaged), jammed, and/or otherwise subjected to defensive measures. Note that "target" here is not necessarily the same kind of "target" defined in one or more of the commonly-assigned patent documents referred to and/or incorporated by reference below. Note further that although we may occasionally refer to a target/object (or equivalent term) in the singular, the general description of the processes and systems involved may apply to multiple targets; multiple targets may be sensed, jammed, and/or otherwise subjected to defensive measure at different times or at the same time.

In this document, the expression ad hoc in reference to nodes of an array of nodes is used to signify that at least some (or all) of the ad hoc nodes have their own physical clocks, and the nodes are "untethered" in the sense that they may be (1) free to move, in absolute terms (e.g., with respect to a point with fixed coordinates, and/or with respect to any or all of the targets), and to move with respect to each other; and (2) free to rotate individually around one or more axes. Some constraints on the movements of some or all of the nodes need not necessarily vitiate their untethered character; for example, nodes that are free to move in only one or two dimensions (and not all three dimensions) may still be ad hoc nodes, whether or not they rotate around any axis. Examples of such nodes may include radios carried by a squad of soldiers; radios onboard different aircrafts, water vessels or buoys, land vehicles, satellites; and similar nodes. The nodes may also be ad hoc even if they are not used in TR-communications or sensing; for example, nodes of a directional beamforming array may also be ad hoc nodes.

Some definitions have been explicitly provided above. Other and further explicit and implicit definitions and clarifications of definitions may be found throughout this document.

FIG. 1 illustrates in a high level, block-diagram manner, selected nodes of an array 100. This array includes ad hoc nodes 105 that may communicate with each other, and synchronize their respective clocks (i.e., aligning time and frequency). As shown, the array 105 includes five distributed cooperating nodes, 105-1 through 105-5. In similar examples, the array 105 may include any number of a plurality of nodes 105, for example, 2, 3, 4, 5, 6, 7, 8, 9, 10, or more.

The nodes 105 may be within Line-of-Sight or Non-Line-of-Sight of each other, and may communicate directly and indirectly with each other via side channel links 120. As shown, the links 120-1, 120-2, and 120-4 connect the node 105-3 to each of the nodes 105-1, 105-2, and 105-4, respectively; and the link 120-5 connects the node 105-4 to the node 105-5. The node 105-3 may thus communicate directly with each of the nodes 105-1, 105-2, and 105-4. The node 105-3 may communicate with the node 105-5 indirectly, through the node 105-4 and the links 120-4 and 120-5. This is just one example. More generally, any of the nodes 105 may be connected by such side channel link 120 to any of the other nodes 105, and any of the nodes may lack a direct link to any other node (or nodes), and communicate with such other nodes through intermediate nodes and multiple (two or more) links. The side channel links 120 may be implemented, for example, using short-range radio frequency (RF) link such as a Bluetooth® link, WiFi, or other short-, medium-, and longer-range RF technologies. As discussed in some of the commonly assigned patent documents incorporated herein by reference (the "incorporated patent documents" listed below), the side channel links 120 may also be implemented using non-RF technologies and transmission media, including optical technologies, such as free-space or guided optics, and sound/acoustic (ultrasound) technologies.

Figure 2:
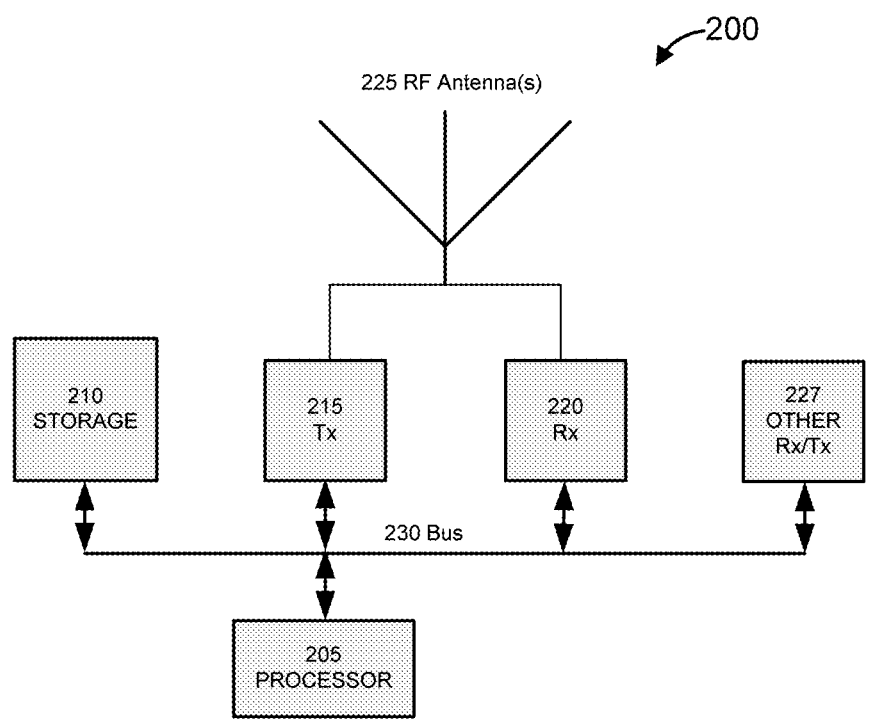
FIG. 2 illustrates selected elements of a node of FIG. 1.

FIG. 2 illustrates selected elements of an apparatus 200 configured in accordance with one or more features described in this document. The apparatus 200 may be any of the cooperative nodes 105. The apparatus may include a processor 205; a storage device 210 (which may store program code for execution by the processor 205 and other program code and data); an RF receiver 220 configured to receive radio frequency signals, such as sounding signals and their reflections/backscatter, information from other nodes, and other signals; an RF transmitter 215 configured to transmit radio frequency signals, such as sounding signals, collaborative communications to a base station, designated targets, information for other nodes, and still other signals; one or more RF transmit and receive antennas 225 coupled to the receiver 220 and the transmitter 215; and a non-RF processing module 227, such as an optical or acoustic transceiver and associated signal processing devices. A bus 230 couples the processor 205 to the storage device 210, the receiver 220, the transmitter 215, and the non-RF processing module 227; and allows the processor 205 to read from and write to these devices, and otherwise to control operation of these devices. In embodiments, additional receivers and/or transmitters and/or other devices are present and coupled to the processor 205.

Time Reversal techniques may combine (1) "sounding" of a channel with (2) applying pre-filtering to a transmission, e.g., time-reversing the channel response from one object to another (such as a channel impulse response) and convolving the time-reversed response with data to be sent or with some other signal such as a pulse/burst or another waveform (which may be a well-autocorrelated waveform). "Sounding" and its inflectional morphemes refer to transmitting a signal for the purpose of obtaining information about the channels, for example, for forming TR signals. "Sounding" and its inflectional morphemes may also refer to opportunistic sounding, that is, the sounding signal may be transmitted for another purpose but also used for obtaining the channel state information. The sounding signal may be a sharp pulse approaching an impulse, a Gaussian burst, or another appropriate burst with substantially flat frequency response in the communication band, and having a good autocorrelation function (i.e., approaching that of an impulse function), as is known in communication theory and related fields (e.g., CDMA, autocorrelation radar).

Time-reversal communications using sounding are described in several commonly-owned and related patent documents, including the following:

1. U.S. patent application Ser. No. 13/462,514, Publication Number 2012-0328037, entitled ANTI-GEOLOCATION, filed on 2 May 2012;

2. International Patent Publication WO/2012/151316 (PCT/US2012/36180), entitled DISTRIBUTED CO-OPERATING NODES USING TIME REVERSAL, filed 2 May 2012;

3. U.S. patent application Ser. No. 14/114,901, Publication Number 2014-0126567, entitled DISTRIBUTED CO-OPERATING NODES USING TIME REVERSAL, filed on 30 Oct. 2013;

4. U.S. Provisional Patent Application Ser. No. 61/481,720, entitled DISTRIBUTED CO-OPERATING NODES USING TIME REVERSAL FOR COMMUNICATIONS, SENSING & IMAGING, filed on 2 May 2011;

5. U.S. Provisional Patent Application Ser. No. 61/540,307, entitled DISTRIBUTED CO-OPERATING NODES USING TIME REVERSAL FOR COMMUNICATIONS, SENSING & IMAGING, filed on 28 Sep. 2011;

6. U.S. Provisional Patent Application Ser. No. 61/809,370, entitled APPARATUS, METHODS, AND ARTICLES OF MANUFACTURE FOR COLLABORATIVE BEAM-FOCUSING OF RADIO FREQUENCY EMISSIONS, filed on 7 Apr. 2013;

7. U.S. Provisional Patent Application Ser. No. 61/829,208, entitled APPARATUS, METHODS, AND ARTICLES OF MANUFACTURE FOR COLLABORATIVE BEAM-FOCUSING OF RADIO FREQUENCY EMISSIONS, filed on 30 May 2013;

8. International Patent Application PCT/US2014/033234, entitled DISTRIBUTED CO-OPERATING NODES USING TIME REVERSAL, filed 7 Apr. 2014;

9. U.S. patent application Ser. No. 14/247,229, entitled DISTRIBUTED CO-OPERATING NODES USING TIME REVERSAL, filed on 7 Apr. 2014;

10. U.S. Provisional Patent Application Ser. No. 61/881,393, entitled APPARATUS, METHODS, AND ARTICLES OF MANUFACTURE FOR COLLABORATIVE ARRAY COMMUNICATIONS INCLUDING BEAMFOCUSING OF EMISSIONS, filed on 23 Sep. 2013;

11. U.S. patent application Ser. No. 14/476,738, entitled SYNCHRONIZATION OF DISTRIBUTED NODES, filed on 4 Sep. 2014;

12. U.S. patent application Ser. No. 14/494,580, entitled SYNCHRONIZATION OF DISTRIBUTED NODES, filed 23 Sep. 2014; and 13. U.S. Provisional Patent Application Ser. No. 62/126,437, entitled TIME REVERSAL IN WIRELESS COMMUNICATIONS, filed on 27 Feb. 2015.

Each of the patent documents described above is hereby incorporated by reference, including specification, claims, figures, tables, computer code appendix, and all other matter in the patent document. We may refer to these documents and other commonly-owned patent documents identified throughout the present document collectively as "incorporated applications" and "incorporated patent documents."

Figure 3:
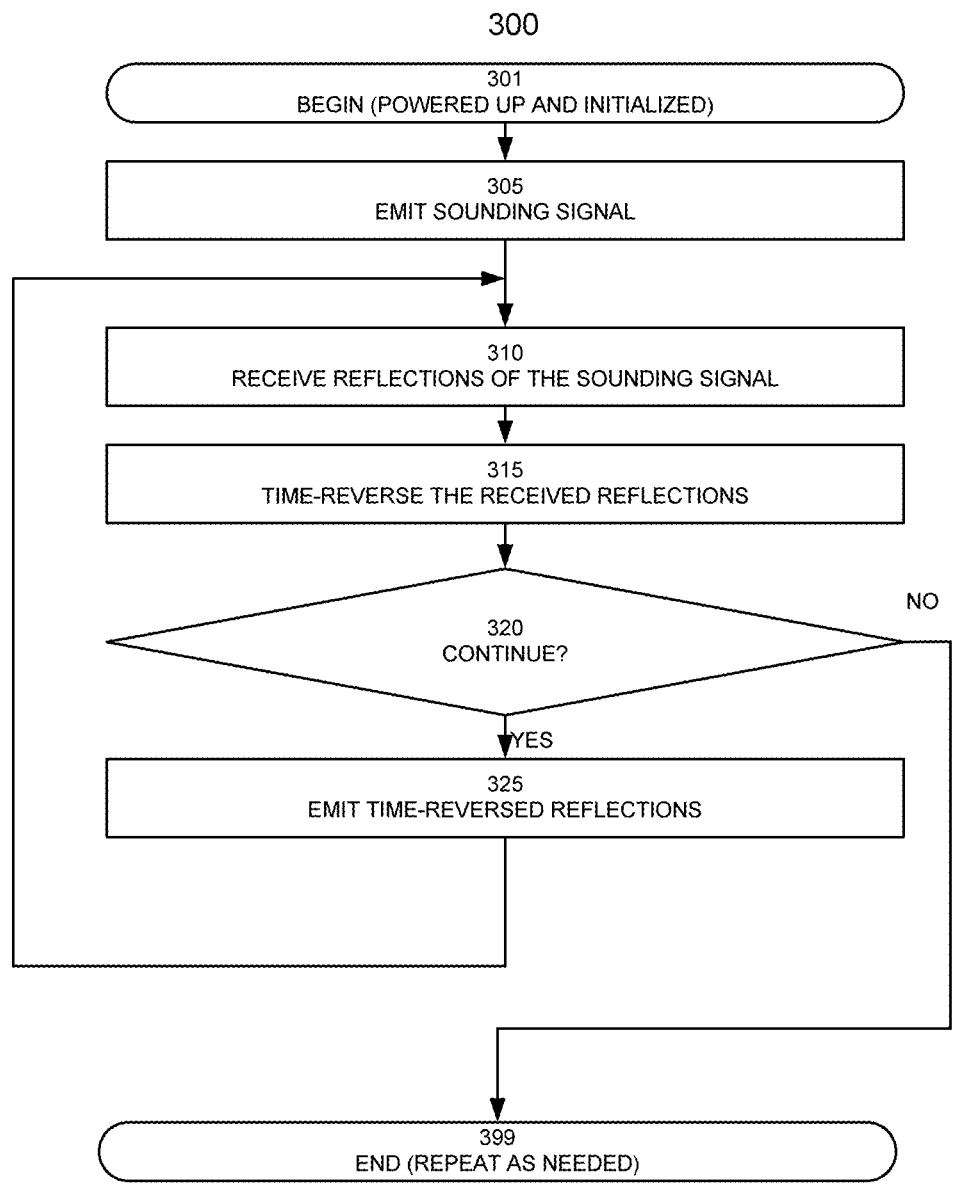
FIG. 3 illustrates selected steps of a Radio Frequency iterative Time-Reversal process.

The sounding signal in a time-reversal process may be sent from the same node that receives the channel impulse response information obtained from the reflections of the sounding signal by other objects. (As should be understood by a person skilled in the art after perusal of this patent document and the incorporated patent documents, the sounding signal may instead or in addition be transmitted by another node.) The steps of sounding and transmitting the time-reversed channel may be performed iteratively, with the time-reversal signal beam transmitted by the node at each step becoming more focused on an object, and hence the resulting reflections at each iteration may provide improved estimates of the channel. We may refer to this as Reciprocal Convergence Process, as RF iterative time-reversal, or simply as RF-ITR. FIG. 3 illustrates selected steps of an RF-ITR process 300.

The process 300 begins at flow point 301, where the apparatus performing the process 300 (e.g., a node 105/200 or an array of such nodes) is powered up and initialized. Initialization of an ad hoc array of nodes may include frequency and time alignment of the individual nodes, so that the nodes can transmit synchronously (or substantially synchronously to the degree that their transmissions combine in space and time to focus on a predetermined object and/or to form a beam in a predetermined direction).

In step 305, the channel is sounded using an initial sounding signal, which may be an omnidirectional or substantially omnidirectional signal with a good autocorrelation function, such as a pulse, burst, etc. An omnidirectional emission may be similar to an emission from a dipole radiator, and need not have beamforming weights.

The emission of the sounding signal may be from an array of synchronized transmitters, including an array of synchronized ad hoc nodes and an array of synchronized nodes that are not ad hoc nodes. In the case of an array (an ad hoc array or another array), the individual nodes of the array may send their separate sounding signals; alternatively, some or all of the array elements may coordinate and send the sounding signal in a cooperative and synchronized manner. The latter case enables time and spatial focusing, as is described above and in the incorporated patent documents. The incorporated patent documents also describe various ways to synchronize ad hoc nodes.

In step 310, the reflections of the sounding signal emitted in the most recent step 305 are received and recorded by one or more nodes of the array, generally including the node or all/some of the nodes that emitted the sounding signal. The reception window is finite; it may be made sufficiently long to receive all significant reflections of the most recent sounding signal.

The reflections received in the step 310 are time-reversed in step 315.

In decision block 320, a test is performed and a decision is made whether the process should continue. The decision may be made, for example, based on whether an object's location relative to the nodes has been determined with sufficient precision, that is, whether the array has adequately focused on the object; a benchmark example of a metric on which the decision may be based is a SNR (e.g., Signal to Noise Ratio above a predetermined SNR threshold being indicative of good focus), to be able to track the object; another benchmark may be the consistency of the reflected sounding signal from one iteration to the next such as the updated TR pre-filtering weights after each iteration. Hysteresis tables may serve as benchmarks during tracking. If the test indicates that the process should continue, the latest time-reversed reflections are emitted as the new sounding signal, in step 325, and the process flow returns to the step 310. Thus, the steps 310, 315, and 325 may be repeated sequentially, i.e., each time each of the reflected sounding signals may be time-reversed and re-emitted. After several iterations, as determined in the decision block 320, the signal energy should automatically focus on the object that is the strongest scatterer in the field, and the process may then terminate at flow point 399, to be repeated as needed (possibly repeated continually).

As has already been noted, sensing moving objects or targets may be of particular interest. Targets may be distinguished from stationary objects (clutter or clutter objects) based on the velocity of the objects. For example, an object with the velocity (relative to the ground) below a predetermined limit (for example, less than 1, 5, 10 mph) may be considered a clutter object. Because RF-ITR focuses on the strongest scatterer, it may (and typically would) focus on a clutter object rather than a moving target.

Thus, the RF-ITR process such as the process 300 will tend to focus on the strongest reflector-scatterer, often within just a few iterations. Once the strongest reflector is identified, the pre-filters for time reversal may be adjusted to reduce illumination of the strongest reflector, and the RF-ITR process may be repeated to identify the next strongest reflector-scatterer, and so on to characterize the environment. The location of an individual reflector-scatterer relative to the array may be computed using, for example, eigenvalue decomposition and singular value decomposition (SVD). In accordance with this approach, time reversal signals of an array of antennas (e.g., antennas of a node 105/200 or of an array of such nodes) can be mathematically decomposed into a sum of distinct eigenfunctions/eigenstates/eigenvalues or singular states; each eigenstate represents a path from the array to one of the scatterers. If the transmit array transmits only one of these singular states, then the signal is focused on the scatterer represented by that state and the signals incident on the other scatterers are nulled or reduced. We refer to such focusing as "Selective Focusing by Singular Value Decomposition," or "Selective Focusing by SVD." Although the array may lose multipath TR gain in this mode, it can select which scatterer(s) to illuminate and/or determine the locations of the individual scatterers relative to the array.

The locations of multiple scatterers may be determined after each iteration of the Iterative Time Reversal algorithm, by comparing the change in relative location of a scatterer over time. Moreover, the velocity of the individual scatterers may be computed by comparing the phases of the reflections attributable to the scatterer in a series of reflections. Thus, soundings at times t1, t2, t3, etc., may be performed and the phases of the reflections attributable to the individual scatterers may be compared over time. From this information (phase changes over time), Doppler analysis yields the velocities of the individual scatterers. Scatterers with a velocity meeting one or more predetermined criteria (such as velocities over a predetermined limit) may be considered targets; scatterers not meeting the one or more predetermined criteria and/or meeting other criterion or criteria may be considered to be clutter object that are part of the environment. For example, objects with speeds above a predetermined limit (such as 5, 10, or 20 mph) may be considered targets. As another example, objects with speeds above a lower predetermined limit (such as 5, 10, or 20 mph) but below an upper predetermined limit (such as 500 or 100 mph) may be considered targets. As still another example, objects above a predetermined lower limit or within a predetermined range may be considered targets only if their general direction is towards a predetermine location, such as the location of the array, one of the nodes of the array, or another defended location.

More generally, signal classification algorithms may be used to classify objects as targets. An example of the beam nulling algorithm is described towards the end of the specification of this disclosure.

Figure 4:
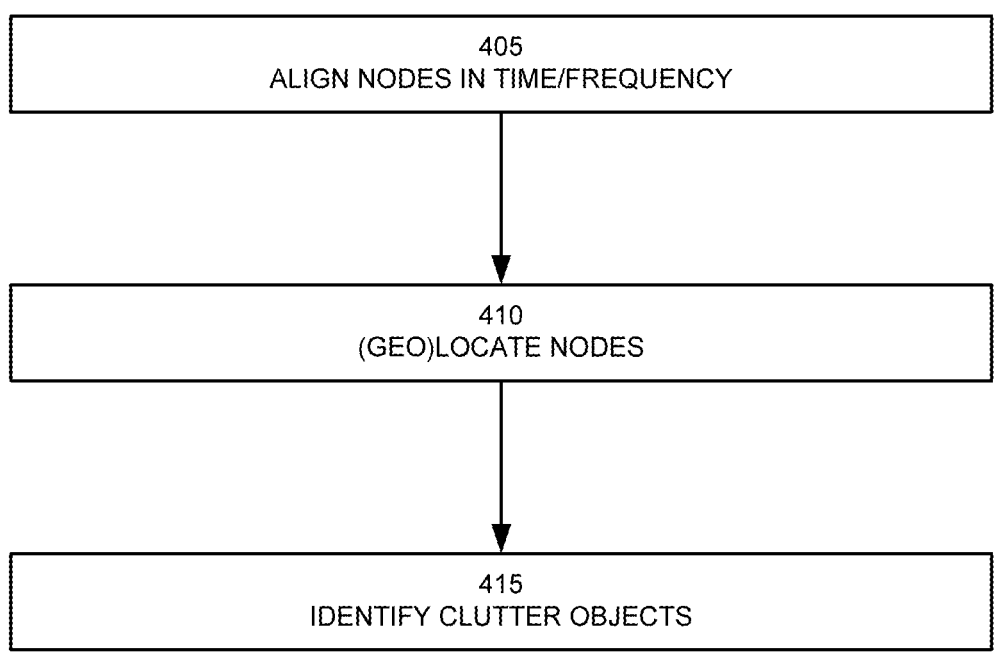
FIG. 4 illustrates selected steps of an environment characterization process.

FIG. 4 illustrates selected steps of a clutter object (environment) characterization process 400, which may be performed, for example, by a distributed array of ad hoc nodes or by an array of nodes tethered to a common clock.

In step 405, the clocks of the nodes of the array are time and frequency aligned. This may be unnecessary for nodes already tethered to the same clock, but is generally important for ad hoc nodes.

In step 410, locations of the nodes relative to each other are determined thereby obtaining the relative layout of the nodes of the array; the absolute geolocations of the nodes may also be determined in this step. This can be performed using any location techniques, such as those based on GPS, D-GPS, time-of-flight, self-localization, or still other techniques.

In step 415, the nodes perform clutter object (environment) characterization. This can be done, for example, using the techniques described or alluded to above, such as RF-ITR with successive elimination of clutter objects, and SVD or eigenfunctions/eigenstates/eigenvalues decomposition. Thus, each node of the array may emit an omnidirectional search pulse in time division manner. Each node may then receive the backscattered signal and maintain a log of this signal every time step 415 is performed to update the clutter backscattered signals. Eventually, the nodes may share such information (e.g., via side channel links such as the links 120) in order to use it in all nodes during the target search and tracking phases. The omnidirectional clutter characterization signal can also be emitted by all nodes (or a subset of them) simultaneously. The backscattered information from the clutter objects may be logged and shared among the nodes.

The locations of the clutter objects (typically but not necessarily located between the nodes and target objects) are determined and the environment is characterized since the signal reflected by the clutter objects may be more intense then signal reflected by the target objects because the latter may be located further away from the clutter and the nodes of the array. Then, the TR pre-filtering factors in the weights associated with nulling the clutter objects may be determined (see nulling description above and also below) so that the array may be configured to proceed with the RF-ITR to detect and track the target objects.

In the same way, with the addition of applying some criterion (or criteria, as the case may be), targets may be identified and tracked from one sounding to the next. The timing on the sounding pulse emitted by the nodes may be coordinated or staggered (randomly or otherwise) to continually sound the channel in order to discover any moving targets, such as UAVs. Here again, there are different ways to sound the channel.

For example, each node may send an omnidirectional pulse, with the pulses of the nodes being staggered in time. If the backscattered signal received by the node is identical or sufficiently similar to the previously logged signal (e.g., comparison of the two signals yields a difference below a predetermined threshold), then no additional significant mobile targets may be present. (The comparison may be based on the sum of the squares of the sample differences between the two signals; if the sum of the squares is below a predetermined "similarity" threshold, the backscattered signals of the two signals are sufficiently similar.) If, however, the successive signals are insufficiently similar, then each node may perform differential processing to remove the background clutter objects from the backscattered sounding signals (e.g., sounding pulses) in order to derive the TR pre-filtering associated with the target(s). In a variant, all or a subset of the nodes may send omnidirectional pulses simultaneously. The array may add random phase offsets among the nodes to scan with different array radiation patterns, to accommodate the possibility of a target being located in a null. (Generally, a moving target should move out of the null region and be sensed relatively quickly.)

In a somewhat different example, all or a subset of nodes of the array may send omnidirectional signals simultaneously. If the backscattered signals received by a particular node is identical or substantially similar to the previously logged signal (i.e., comparison of the two signals yields a difference below a predetermined threshold), then it may be concluded that no additional targets may be present. If, however, the signals are sufficiently different (the difference is above a predetermined threshold), then each node may perform differential processing to remove (null) the clutter objects from the backscattered sounding signals in order to derive the TR pre-filtering associated with the target at each node. If a target happens to be located in a null, then the array may add random phase offsets to the sounding signals to scan with different array radiation patterns.

Once a target is identified, the sounding may be performed with the TR pre-filters configured to increase the SNR of the target, by focusing the sounding signal on the target. After multiple iterations of sounding with the TR pre-filters in such an iterative way, the steering vector to the target may be refined, and an improved steering towards the target may be automatically discovered without calculation or estimation. The coordinates of the target may then be calculated using, for example, the backscatter return time-of-arrival and array layout configuration.

Figure 5:
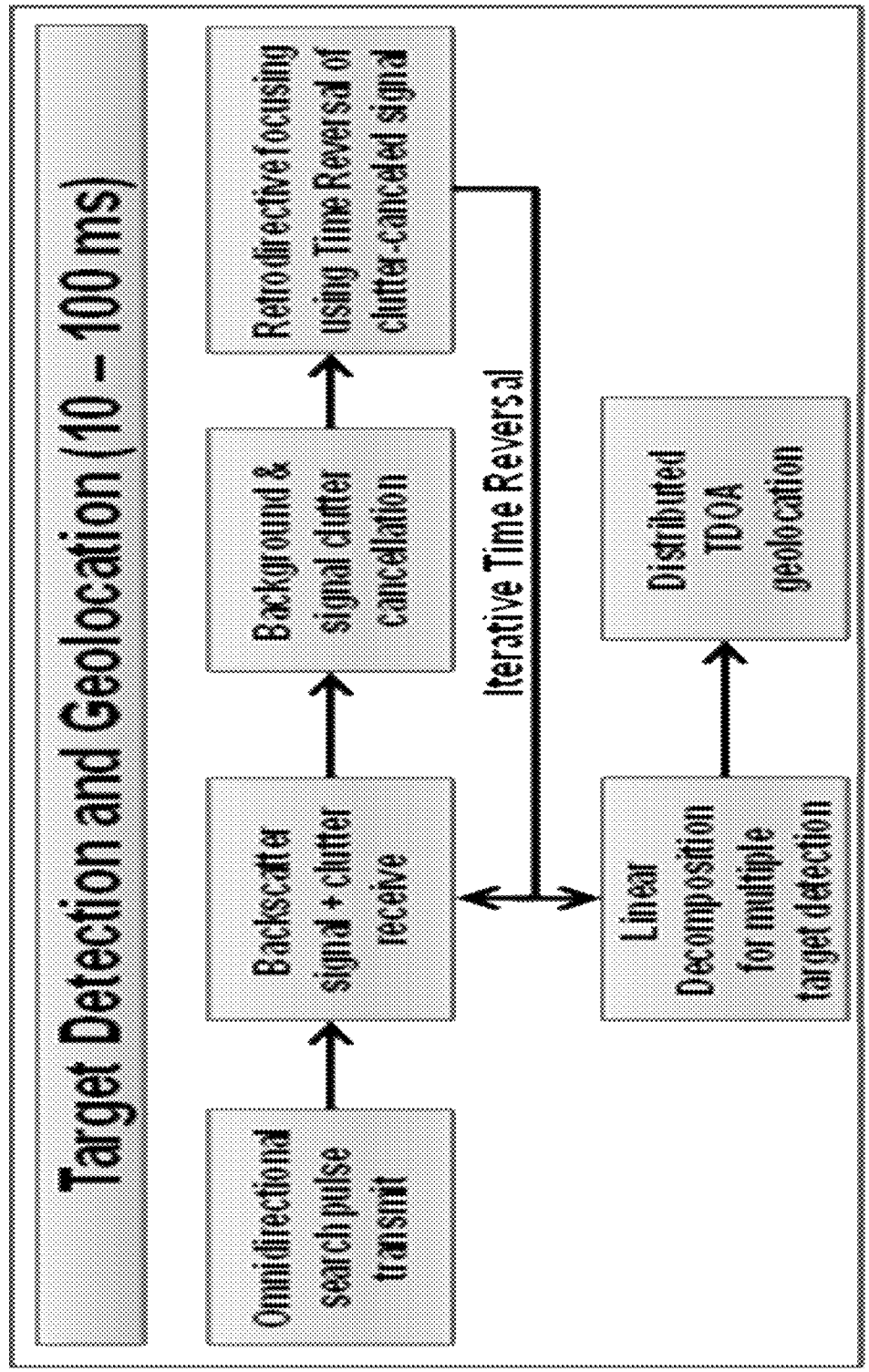
FIG. 5 illustrates selected steps of a multiple target location process where relative location is performed using Time-Difference-of-Arrival (TDOA)

Multiple targets may be processed in a similar way, using linear decomposition to determine individual backscatter responses and array layout. For example: (1) determine the TR pre-filters of the strongest target backscattered signal; (2) remove such target from subsequent sounding (by adjusting the TR pre-filters to reduce illumination of this target, analogously to the Selective Focusing by SVD) to obtain the second strongest target backscattered signal; (3) determine the corresponding TR pre-filter of the second target; (4) remove the second target from subsequent sounding; and so on for additional targets, if needed, until all the TR pre-filters associated with all the targets are determined and shared among the nodes of the array. FIG. 5 illustrates selected steps of a multiple target location process 500 where the relative location is performed using Time-Difference-of-Arrival (TDOA).

Thus, the RF-ITR process with clutter cancellation should inherently focus on the strongest scatterer in the clutter-canceled signal, generally the target with the strongest scattering. Repeating the process after cancelling the strongest target should focus on the target with the next strongest scattering (if there is such a target), and so on for additional targets. The process may also equalize the steering vectors such that energy is focused on select scatterers in the field via eigenvalue decomposition. After the target backscatter signal has sufficient SNR, the array may perform time-of-arrival (TOA) target location relative to the array, TDOA target location relative to the array, or other target location relative to the array based on the target's enhanced return.

The target's absolute geolocation is then also known if the coordinates of the array's nodes are known. Therefore, absolute geolocation of a target can be performed when assisted GPS or D-GPS is used during the process.

As the target continues its motion, it may begin to move off focus, resulting in a weaker target return (reflection). On the next retrodirection (TR sounding) cycle, the array should receive the target's return from the new location. The array may then use the new backscatter return to determine the transmit beamforming (e.g., pre-filters) to the target for the following round. The reconvergence to full beamforming may depend on the degree of target movement off focus over the retrodirection time (one sounding to the next).

When a new target enters the field of view, it will reflect the sounding signal, even when embedded in noise (e.g., −10 dB). The array may retrodirect the recorded signal via TR back into the field of view. The array may then repeat this step of recording and TR retrodirection of the backscatter signals in an iterative manner. In an example, each step may be approximately 1 ms in duration, including signal buffering time, retransmission time, and round trip time-of-flight. Through these multiple steps, the array converges from omnidirectional search to focused tracking due to the coherent addition of the embedded target eigenmode versus the incoherent addition of uncorrelated noise. In the example, an increase >30 dB in signal on target in 100 sounding steps is enabled, in approximately 100 ms. The array nodes do not need to know that a target signal is embedded in their recording, enabling simple and fast processing for operation of fast moving nodes and targets. The target coordinates may then be calculated via multilateration using the relative node layout derived and the TDOA of the target return.

In an example, an array detects the strongest non-clutter scatterer in its field of view (i.e., a moving target with the strongest reflection). Because the relative node layout is known, advanced multiple target detection/tracking algorithms can be used to track multiple targets (e.g., UAVs), such as SVD-based eigenmode decomposition, Kalman filter-based methods, and/or Multiple Signal Classification (MUSIC) algorithms and their variants. The number of simultaneously trackable targets to first order depends on the rank of the matrix, which will typically have an upper bound of the number of nodes in the array's aperture in high SNR (e.g., a maximum of ten targets for ten nodes). A beam-nulling algorithm may be used to identify targets and suppress target-directed eigenmodes coherent energy for ad hoc arrays. For multiple target tracking, the beam-nulling algorithm can be used sequentially to identify the strongest target in the field of view, turn off the transmit eigenmode to the target, and then amplify the next strongest target backscatter return. This process may be continued sequentially from the strongest target to the weakest target. In examples, the array may simultaneously use predictive tracking and coherent receive gain to monitor the "nulled" targets via coherent receive of secondary returns across the aperture.

Detection range for a fixed target resolution often scales with aperture size and inversely with wavelength. Thus, a large distributed aperture size may compensate for the relatively long carrier wavelengths (e.g., at <1 GHz) to achieve resolution similar to that achievable with an X-Ku radar panel. Furthermore, array embodiments can take advantage of the 802.11ac and 11 ax 5 GHz low cost, multiple antennas, and wide bandwidth radios to implement RF-ITR with an efficient gradient descent technique to converge from omnidirectional search to focused beamform target tracking. Using a 1 GHz carrier for inexpensive nodes, a squad-platoon may achieve a proximity detection range of >1.5 km with soldier spread size of 200 m for 3 m target resolution. In examples, a forward operating base may extend detection range to >7 km with a larger perimeter fence of up to 1 km for similar resolution. If a structure of opportunity such as a hillside is available, a series of nodes may be thrown down to create a massive aperture for a detection range of >15 km without the need for roads or trails. An array implementing this capability may avoid the use of a brute-force focused-beam raster scan, which may be required to achieve sufficient power on target for adequate detection SNR, and thus may cut maximum search time from tens of seconds for a truck mounted radar to hundreds of milliseconds. Sensitivity to resonance signatures at low carrier frequencies has the potential to reduce maximum search time by up to a factor of ten.

The systems and methods described may be used to exploit TR in spotlight synthetic aperture radar imaging in multipath rich environments. When targets are located in rich scattering environments, conventional Synthetic Aperture Radar may result in ghosting artifacts due to multiple bounces by surrounding scatterers. Time reversal algorithms can be used to process signals' phase history data in rich multipath scattering to automate target recognition, for example, using signatures or other identification tables. The backscattered returned signal may undergo stretch processing and IF sampling to obtain the phase history data.

Because TR of the demodulated signal can be treated as phase conjugation in the spatial frequency domain, the use of linear FM chirp and stretch processing translates the pulse compressed signal into Fourier transform in range (spatial) domain. Thus, range may be converted into spatial frequency. As a result, phase conjugation can be applied directly to the pulse compressed signal as shown in Figure First, the environment is probed and clutter objects characterized.

Second, a target is probed. The signal returns recorded in the first step may be subtracted out in this step. The subtraction procedure should remove the strong reflections from dominant scatterers in the vicinity of the target. In a multipath rich environment, the compressed return signal is the superposition of the direct path from the target and the multiple reflection due to the surrounding scatterers.

Third, the return signal is time-reversed, phase conjugated, and energy normalized.

Fourth, TR-SAR processing is performed to select captured window where the image is processed. Windowing may thus be used to remove the interference caused by very strong reflectors (for instance, trihedral corner reflectors), and to localize the multipath reflection in the region of interest (ROI).

The selected image chip undergoes the windowed inverse Fourier transform to extract the signal for subsequent time reversal processing. By matching the returned time-reversed signal by the estimated target impulse response filter, data for image reconstruction may be obtained.

In examples, and array operates in a stealth mode, using a signal of opportunity emitted by a target for detection. The nodes of the array detect the signal of opportunity, leveraging their spatial distribution to leverage RX coherence into an M-fold gain via coherent signal combining, stealthily tracking the target. For a 10-node array, for example, coherent receive processing may enable the standoff range to be enhanced by a factor of three. Passive detection can be turned into active jamming where the transmit beamforming weights of the ad hoc array are discovered automatically from the signal of opportunity, resulting in $N^2$ gain frequency matched to the RF emissions of the target using TR processing.

The methods and systems described in this document may also enable through-the-wall target discovery, tracking, identification, and imaging. The clutter objects in this case may include opaque obstacles situated between the target and the array of nodes. The nodes may be collocated in one radio to reduce the device size, be distributed along the perimeter of the room or building, or otherwise arranged and implemented.

Figure 6:
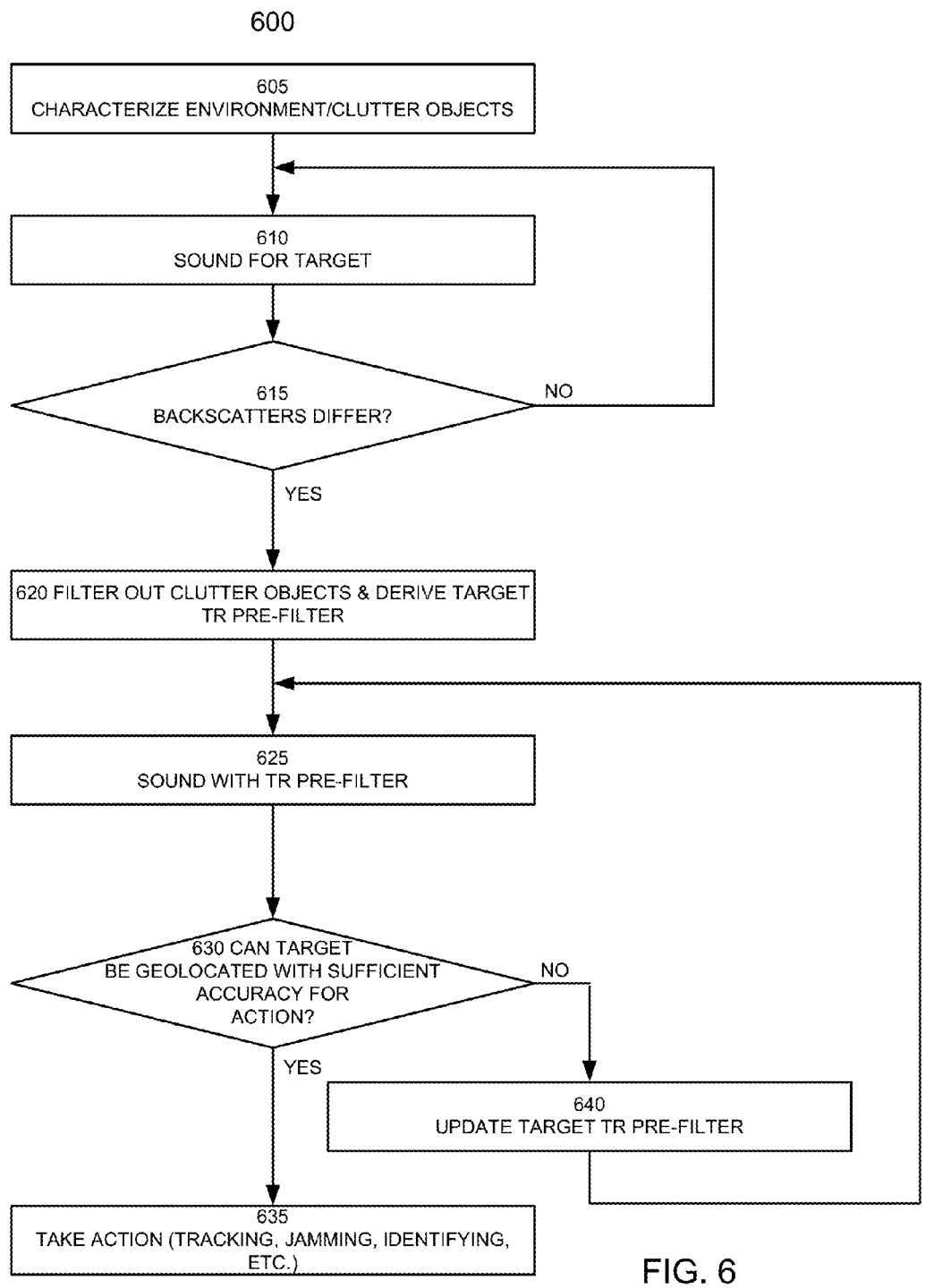
FIG. 6 illustrates selected steps of a process of sensing a target.

In the Bistatic and Multistatic implementations, some array nodes receive and process the backscattered signals due to sounding signals emitted by other array nodes while sharing such information among nodes in tethered and/or untethered ways. For instance, in steps 605-625 of the process 600 of FIG. 6, some or all the nodes may receive and process the backscattered signals simultaneously to accelerate the detection and extract higher resolution tracking and imaging after factoring the nodes' relative locations.

In other embodiments, nodes may be clustered in different locations, making it faster to detect, geolocate, and identify targets from different angles by allowing all radios to receive, process, and share backscattered information.

The systems and methods described in this document may also be used to transfer power wirelessly, charging devices using beam-focusing or spatial focusing on the devices. In this specific application, the device may initially emit a signal announcing its presence that can be used by the array nodes to locate the device and focus the radiation on the device being charged and eventually perform relative geolocation of the device using array of nodes coordinates.

We now describe the TR beam nulling algorithm used to null clutter objects or undesired target objects. As previously indicated, TR algorithms may suppress the eigenmodes coherent energy associated with the clutter objects that it is desired to null. Let us assume that the nodes identify two objects, i and j, in the array's field of view. Furthermore, let us assume that the total number of antennas of all nodes is M. Similarly, a single radio with M antennas also may be used instead of the distributed nodes. The pre-TR-filter weights assigned to each of the M antennas encompass the beam-focusing TR pre-filter vector targeting objects i and j while nulling object i signal in the direction of object j, and vice versa, or nulling object j all together. Such antenna weights can be derived when the correlation between the $CIR_i$ and $CIR_j$, which are the CIRs between Tx/Rx nodes and objects i and j respectively, is low. (CIR stands for "channel impulse response.") Therefore, these two objects are uncorrelated (orthogonal to each other) or slightly uncorrelated, and hence they can be distinguished from each other using the TR and SVD methods such as Zero-Forcing (ZF), Modified Zero-Forcing (MZF), and Dirty Paper Coding (DPC).

If we denote by $H(\omega)$ the CIR matrix where each row is the CIR between the nodes M antennas and each of the uncorrelated objects, then the matrix $H^H(\omega)H(\omega)$ is invertible, which is the cornerstone of SVD method. The TR pre-filter $TRF(\omega)$ that will encompasses the beam-focusing and nulling weights at each of the Tx/Rx antennas is defined such that $TRF(\omega)$ is the product of a linear transformation matrix A and a diagonal power matrix P restricted by the total maximum transmit power, i.e. $TRF(\omega)=A\ P$.

ZF is when A is defined as $A=H^H\ (H^HH)^{-1}$.

MZF is when A is defined as $A=H^H\ (H^HH+(N_0/P_{avg})I)^{-1}$.

And DPC is when A is defined as $A=H^H\ R^{-1}$ and R is an upper triangular matrix.

Hence the signal focused on objects i and j can be written as $Y=G(\omega) X+n$, where $G(\omega)=H(\omega) TRF(\omega)$, n is the noise, and X is the sounding signal vector. Then, the nulling condition may be written as $y_i \cong g_{ii} x_i + n_i$ and $y_j \cong g_{jj} x_j + n_j$, where the cross-objects interference terms corresponding to $g_{ij}$ are negligible due to the application of one of the three beam nulling algorithm mentioned above.

These algorithms may also apply to multi-user TR communication when the Access Point (AP) is communicating with multiple users simultaneously. In this case, the TR pre-filters assigned each of the AP antennas may be selected such that each users' signal is beam-focused to that specific user, while nulling it in the direction of other users to reduce the crosstalk between and among the multiple users. Such transmit beamforming and nulling, also referred to as space division multiple access, enables signal separation by directing one or multiple beams simultaneously towards users at different spatial locations without creating crosstalk between them. These algorithms can be conducted in the time and frequency domain signal processing. Conventional MIMO multi-user encoding techniques based on users' interference pre-subtraction are complex to implement with exponentially increasing complexity when the number of users increases.

The features described throughout this document may be present individually, or in any combination or permutation, except where the presence or absence of specific elements/limitations is inherently required, explicitly indicated, or otherwise made clear from the context.

Although the process steps and decisions (if decision blocks are present) may be described serially in this document, certain steps and/or decisions may be performed by same and/or separate elements in conjunction or in parallel, asynchronously or synchronously, in a pipelined manner, or otherwise. There is no particular requirement that the steps and decisions be performed in the same order in which this description lists them or the Figures show them, except where a specific order is inherently required, explicitly indicated, or is otherwise made clear from the context. Furthermore, not every illustrated step and decision block may be required in every embodiment in accordance with the concepts described in this document, while some steps and decision blocks that have not been specifically illustrated may be desirable or necessary in some embodiments in accordance with the concepts. It should be noted, however, that specific embodiments/variants/examples use the particular order(s) in which the steps and decisions (if applicable) are shown and/or described.

The instructions (machine executable code) corresponding to the method steps of the embodiments, variants, and examples disclosed in this document may be embodied directly in hardware, in software, in firmware, or in combinations thereof. A software module may be stored in volatile memory, flash memory, Read Only Memory (ROM), Electrically Programmable ROM (EPROM), Electrically Erasable Programmable ROM (EEPROM), hard disk, a CD-ROM, a DVD-ROM, or other form of non-transitory storage medium known in the art. Exemplary storage medium or media may be coupled to one or more processors so that the one or more processors can read information from, and write information to, the storage medium or media. In an alternative, the storage medium or media may be integral to one or more processors.

This document describes in detail the inventive apparatus, methods, and articles of manufacture for sensing and other techniques using ad hoc and tethered arrays, Iterative Time Reversal, beamnulling, SVD/eigenvalue decomposition, Doppler/differential processing, and other techniques. This was done for illustration purposes and, therefore, the foregoing description is not necessarily intended to limit the spirit and scope of the invention(s) described. Neither the specific embodiments of the invention(s) as a whole, nor those of its (or their, as the case may be) features necessarily limit the general principles underlying the invention(s). The specific features described herein may be used in some embodiments, but not in others, without departure from the spirit and scope of the invention(s) as set forth herein. Various physical arrangements of components and various step sequences also fall within the intended scope of the invention(s).

Many additional modifications are intended in the foregoing disclosure, and it will be appreciated by those of ordinary skill in the pertinent art that in some instances some features will be employed in the absence of a corresponding use of other features. The embodiments described above are illustrative and not necessarily limiting, although they or their selected features may be limiting for some claims. The illustrative examples therefore do not necessarily define the metes and bounds of the invention(s) and the legal protection afforded the invention(s).

What is claimed is:

1. A method of sensing one or more targets, the method comprising steps of:
    aligning a plurality of ad hoc nodes of an array in time and frequency;
    obtaining relative location of each node of the plurality of ad hoc nodes of the array, thereby obtaining relative layout of the array;
    characterizing environment of the array by identifying one or more clutter objects; and
    searching for a first target using radio frequency iterative time reversal (RF-ITR) and clutter cancellation.

2. The method of claim 1, further comprising step of obtaining absolute geolocation of said each node of the plurality of ad hoc nodes of the array.

3. The method of claim 1, wherein the step of characterizing the environment comprises employing RF-ITR with singular value decomposition (SVD) and successive clutter object cancellation.

4. The method of claim 3, wherein at least one of the steps of characterizing and searching for the first target comprises step of performing signal classification.

5. The method of claim 4, further comprising:
    searching for a second target using radio frequency iterative time reversal (RF-ITR), clutter cancellation, and first target cancellation;
    wherein the step of searching for the second target is performed after the step of searching for the first target.

6. The method of claim 5, further comprising:
    searching for a third target using radio frequency iterative time reversal (RF-ITR), clutter cancellation, first target cancellation, and second target cancellation;
    wherein the step of searching for the third target is performed after the step of searching for the second target.

7. The method of claim 4, wherein the step of performing signal classification comprises Doppler processing.

8. The method of claim 4, wherein the step of performing signal classification comprises performing differential processing.

9. The method of claim 4, wherein the step of performing signal classification comprises comparing location of the first target resulting from successive soundings of the first target.

10. The method of claim 3, wherein the step of searching for the first target comprises step of performing signal classification based on direction of object movement.

11. The method of claim 3, wherein the step of searching for the first target comprises step of performing signal classification based on speed of object movement.

12. The method of claim 1, further comprising jamming the first target.

13. The method of claim 1, further comprising munition guidance to the first target.

14. The method of claim 1, wherein the array comprises at least three ad hoc nodes.

15. The method of claim 1, wherein the array comprises at least four ad hoc nodes.

16. An array of a plurality of ad hoc radio frequency nodes, the array being configured to:
align the plurality of ad hoc nodes in time and frequency;
obtain relative location of each node of the plurality of ad hoc nodes of the array, thereby obtaining relative layout of the array;
characterize environment of the array by identifying one or more clutter objects; and
search for a first target using radio frequency iterative time reversal (RF-ITR) and clutter cancellation.

17. The array of claim 16, wherein the array is further configured to obtain absolute geolocation of said each node of the plurality of ad hoc nodes of the array.

18. The array of claim 16, wherein the array is further configured to characterize the environment by performing RF-ITR with singular value decomposition (SVD) and successive clutter object cancellation.

19. The array of claim 18, wherein the array is further configured to search for the first target employing a signal classification process.

20. The array of claim 19, wherein the array is further configured to:
search for a second target using radio frequency iterative time reversal (RF-ITR), clutter cancellation, and first target cancellation.

21. The array of claim 20, wherein the array is further configured to:
search for a third target using radio frequency iterative time reversal (RF-ITR), clutter cancellation, first target cancellation, and second target cancellation.

22. The array of claim 19, wherein the signal classification process comprises Doppler processing.

23. The array of claim 19, wherein the signal classification process comprises differential processing.

24. The array of claim 19, wherein the signal classification process comprises comparing location of the first target resulting from successive soundings of the first target.

25. The array of claim 19, wherein the signal classification process is based on direction of object movement.

26. The array of claim 19, wherein the signal classification based is based on speed of object movement.

27. The array of claim 16, wherein the array is further configured to jam the first target.

28. The array of claim 16, further comprising a munition guidance device configured to guide a munition to the first target.

29. The array of claim 16, wherein the array comprises at least three ad hoc nodes.

30. The array of claim 16, wherein the array comprises at least four ad hoc nodes.

31. A method of sensing a target, comprising:
characterizing environment by identifying a plurality of stationary clutter objects using radio frequency iterative time reversal (RF-ITR) with successive clutter object cancellation; and
searching for a plurality of moving targets using clutter cancellation and RF-ITR with successive target cancellation;
wherein the steps of characterizing and searching are performed by one or more nodes, the one or more nodes comprising at least four antennas.

* * * * *